Dec. 31, 1957

P. P. DEAN 2,817,979

RECIPROCATING SCREW ACTUATOR

Filed Feb. 24, 1955

INVENTOR
PETER PAYNE DEAN

BY *Lindsey and Prutzman*
ATTORNEYS

United States Patent Office 2,817,979
Patented Dec. 31, 1957

2,817,979

RECIPROCATING SCREW ACTUATOR

Peter Payne Dean, Westbrook, Conn.

Application February 24, 1955, Serial No. 490,381

9 Claims. (Cl. 74—424.8)

The present invention relates to improvements in hoists of the type employing a traveling threaded stem as the load carrying member.

Such hoists generally include an operating stand having a rotating member within which the traveling stem is threadably received and which serves both to journal the stem and as the means through which power is supplied to raise and lower the stem. The lower end of the stem is connected either directly or through an extension to the apparatus to be hoisted, such apparatus serving to restrain the stem both against rotation and against lateral movement. With such an arrangement, to prevent jamming or binding of the threaded parts, whipping of the stem, or other undue strain on the operating parts, it has heretofore been very important to maintain precise alignment between the stem and the axis of rotation of its driving member in the operating stand. Such alignment is particularly important in hoists having stems of substantial length as, for example, in sluice gate installations for dams and the like, wherein the operating stand is usually located at a conveniently accessible point such as the top of a dam, while the gate carried by the stem may be located in the base of the dam perhaps fifty feet or more below the operating stand. Such alignment, however, is very difficult to maintain in practice, particularly in view of the fact that the operating stand is generally mounted on a foundation of concrete or other rough material, which is difficult to square up initially and is susceptible to tilting due to settling or other causes.

One object of the present invention therefore is to provide a traveling stem hoist particularly suitable for use with sluice gates and the like having improved supporting and driving means for the traveling stem which eliminates the need for precise alignment between the stem and the operating stand of the hoist.

Another object is to provide in a hoist of the character described an improved supporting and driving arrangement for the stem which automatically compensates for misalignment between the stem and the operating stand, and eliminates the possibility of binding or undue strain on the operating parts in the event of misalignment of the stem and operating stand of the hoist.

Another object is to provide a hoist having improved means for absorbing and transmitting to the operating stand foundation the loads developed during operation of the hoist.

Another object is to provide an improved traveling stem hoist which is rugged yet simplified in construction and which will operate effectively for long periods without requiring any adjustments to compensate for misalignment between the stem and operating stand.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 3:
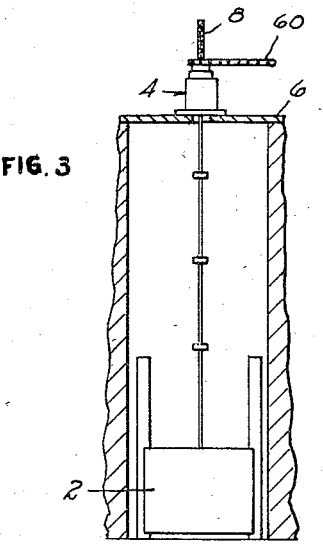
Figure 3 is a schematic view to a diminished scale of a hoist constructed in accordance with the present invention installed for operation with a sluice gate.

Turning to the drawing, a hoist constructed in accordance with the present invention is shown by way of illustration in Figure 3 in a conventional sluice gate installation for a dam. The sluice gate 2 is located down in the body of the dam, normally below a substantial head of water, while the operating stand of the hoist includes an upstanding cylindrical housing 4 having a flanged bottom end mounted on a foundation 6 of concrete or the like vertically above the gate at an accessible level, such as the top of the dam. The traveling stem or lifting shaft 8 of the hoist extends the substantial distance from the operating stand down to the gate, and is restrained by the gate against both rotation and lateral movement.

Figure 1:
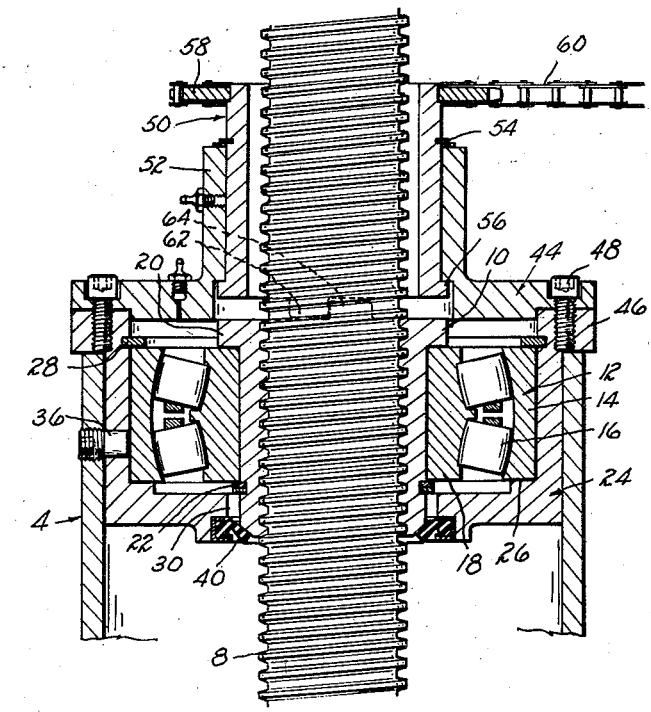
Figure 1 is a fragmentary vertical sectional view of a hoist constructed in accordance with the present invention.

Turning now to the details of the hoist at the operating level, as shown in Figure 1 the stem 8 has an acme thread and is threadably received in a sleeve 10. The sleeve 10 is rotatably supported exclusively in a single spherical bearing 12 including an outer race 14, rollers 16, and an inner race 18 rotatably relative to the outer race and tiltable relative to the axis of the outer race. The sleeve is pressed into the inner race 18 of the bearing and retained therein by a flange 20 integrally formed on the top of the sleeve and by one or more locking rings 22 received in a groove at the lower end of the sleeve. The outer race 14 of the bearing is received coaxially in a cup-shaped casing 24, being supported therein by an elevated shoulder 26 on the bottom of the casing and retained by one or more locking rings 28 engageable with a groove in the side of the casing.

The casing 24 is coaxially received in the top of the housing 4 of the operating stand, and is firmly supported therein by a plurality of circumferentially disposed radial locking pins 36 threadably received in the housing and extending into bores in the side of the casing 24.

The bottom of the casing has a central opening 30 for accommodating the stem and, to prevent leakage of lubricant from within the casing, the opening is provided with a seal 40 which wipes the bottom end of sleeve 10. The wiping surface of the seal and the corresponding surface of the sleeve are spherical and concentric with bearing 12 so that the seal will operate effectively even though the sleeve should tilt relative to the casing.

With this arrangement it may be seen that the operating stand may tilt relative to the stem 8, and such relative tilting will be automatically accommodated by relative tilting movement between the inner and outer race of the spherical bearing 12, thereby completely eliminating any possibility of binding between the threads of the stem 8 and sleeve 10, as well as precluding any bending or whipping of the stem 8 as a result of such tilting. The locking pins 36 absorb the torque on casing 24 as well as the full reactive thrust of the stem 8 during both its upward and downward movement, whether the operating stand is tilted or not, and transmit such loads to the housing and thence to the foundation of the operating stand through a direct path involving a minimum number of parts.

The top of the operating stand is closed by a cover 44 which may be of relatively light construction since it does not take any of the thrust loads on the stem. The cover is secured to a flange 46 at the top of the casing 24 by cap screws 48. Driving power for raising and lowering the stem 8 is supplied through a drive shaft 50 journaled in an upstanding concentric collar 52 on the cover and supported therein against axial movement by one or more locking rings 54 at its upper end and by a flange 56 on its lower end upwardly spaced from the flange 20 of sleeve 10. The drive shaft 50 is hollow and has an inside diameter sufficiently larger than the stem 8 to form a clearance space through which the stem may pass freely as it is raised and lowered, even when the operating stand is tilted relative to the stem. The drive shaft may be connected to a power source by any suitable means, shown by way of example as a sprocket 58 and chain 60.

Figure 2:
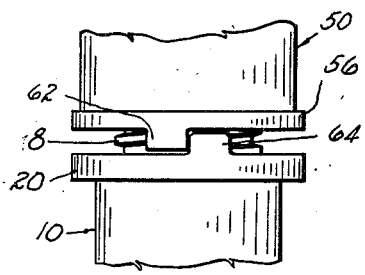
Figure 2 is a fragmentary view of a portion of the hoist shown in Figure 1.

Driving engagement between the drive shaft 50 and the relatively tiltable sleeve 10 is provided by means of one or two angularly spaced lugs 62 depending from the lower flange 56 of the drive shaft and spaced from flange 20 as shown in Figure 2, and a corresponding number of upstanding lugs 64 formed on the upper flange 20 of sleeve 10 in the path of lugs 62, and spaced from flange 56. With this arrangement, as drive shaft 50 rotates, it will rotate sleeve 10 and raise or lower the stem 8, and as the stem 8 is raised or lowered it may travel freely within the drive shaft, the clearance between the drive shaft and stem being sufficient to accommodate relative tilting of the operating stand and stem, and the space between flange 56 and flange 20 being sufficient to accommodate relative tilting of the lugs 62, 64. To improve the effectiveness of the driving contact between lugs 62 and lugs 64 and avoid wear when the operating stand is tilted relative to the stem 8, the driving faces of each lug 62 are made spherical and have the same radius of curvature as the bearing 12. The angular spacing of the lugs on each flange serves to provide substantial rotational lost motion between the drive shaft 50 and sleeve 10, and thereby enables the lugs 62, 64 to engage with a hammer blow which facilitates cracking the gate or other load loose from a stationary condition.

Thus it may be seen that the invention provides an improved supporting and driving arrangement for the traveling stem of a hoist which completely eliminates the necessity for precise alignment of the stem with the operating stand, which automatically accommodates itself to misalignment of the stem and operating stand without impairing the effectiveness of the driving connection to the stem, and which eliminates the possibility of binding or jamming of the hoist, bending of the stem, or other undue strain as a result of such misalignment. The arrangement described further provides a direct path involving a minimum number of parts through which the thrust loads on the stem in both upward and downward directions may be transmitted directly to the operating stand foundation even when the operating stand is tilted. The hoist is thus rugged yet simplified in construction, and will operate dependably for long periods without requiring any adjustment whatever to compensate for tilting of the operating stand.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a hoist having an axially movable non-rotating threaded stem, supporting and driving means for the stem comprising a spherical bearing including a stationary outer race and an inner race rotatable therein and tiltable relative to the axis of the outer race, an internally threaded sleeve mounted in the inner race for threadably receiving the stem, a rotatable hollow drive shaft coaxial with said outer race and having an inside diameter forming a clearance space freely accommodating said stem for axial movement and relative tilting movement, and means forming a relatively tiltable rotative driving connection between said drive shaft and sleeve.

2. In a hoist, a non-rotating axially movable threaded traveling stem, a housing, a spherical bearing having an outer portion and an inner porton rotatable and tiltable relative to the outer portion, means supporting the bearing in the housing with its outer portion approximately coaxial with the traveling stem, an internally threaded sleeve carried by the inner portion of the bearing threadably receiving the traveling stem, a rotatable drive shaft journaled in the housing, and means forming a rotative driving connection between the drive shaft and the sleeve.

3. In a hoist having a non-rotating axially movable threaded traveling stem, a housing, a spherical bearing having an outer race and an inner race rotatable and tiltable relative to the outer race, means supporting the bearing in the housing with its outer race approximately coaxial with the stem, an internally threaded sleeve carried by the inner race of the bearing threadably receiving the traveling stem, a rotatable hollow drive shaft journaled in the housing in coaxial relation with said bearing outer race, said shaft having an inside diameter larger than said stem and forming a clearance space for freely accommodating said stem therein during axial traveling movement and tilting movement of said stem relative to said housing, and relatively tiltable means forming a rotative driving connection between the drive shaft and the sleeve.

4. In a hoist having a non-rotating axially movable threaded traveling stem, a housing, a spherical bearing having an outer race and an inner race rotatable and tiltable relative to the outer race, means supporting the bearing in the housing with its outer race approximately coaxial with the stem, an internally threaded sleeve carried by the inner race of the bearing threadably receiving the traveling stem, a rotatable hollow drive shaft journaled in the housing in coaxial relation with said bearing outer race, said shaft having an inside diameter larger than said stem and forming a clearance space for freely accommodating said stem therein during axial traveling movement and tilting movement of said stem relative to said housing, and means forming a relatively tiltable rotative driving connection between said drive shaft and sleeve including axially extending inter-engageable projections on the opposed ends of said sleeve and drive shaft.

5. In a hoist having a non-rotating axially movable traveling stem, a housing, a spherical bearing having an outer race and an inner race rotatable therein and tiltable relative to the axis of the outer race, means supporting the bearing in the housing with its outer race approximately coaxial with the stem, an internally threaded sleeve carried by the inner race of the bearing threadably receiving the traveling stem, a rotatable hollow drive shaft journaled in the housing in coaxial relation with said bearing outer race, said shaft having an inside diameter larger than said stem and forming a clearance space for freely accommodating said stem therein during axial traveling movement and tilting movement of said stem relative to said housing, opposed flanges on said sleeve and drive shaft, angularly spaced axially extending inter-engageable lugs on said flanges forming a relatively tiltable impact-developing rotative driving connection between said drive shaft and sleeve, and spherical contact surfaces on the lugs on one of said flanges.

6. In a hoist, a non-rotating threaded axially movable traveling stem, a cylindrical housing, a coaxial cup-shaped casing received in the housing having a centrally apertured bottom wall through which said stem extends, radial pins extending through the housing and into bores in the side of said casing for transmitting thrust between the casing and housing, a spherical bearing having an outer race supported in said casing coaxial therewith and a rotatable inner race tiltable relative to the axis of the outer race, an internally threaded sleeve carried by the inner race of the bearing threadably receiving the traveling stem, a rotatable drive shaft journaled in the housing, and means forming a rotative driving connection between the drive shaft and the sleeve.

7. In a hoist, a non-rotating threaded axially movable traveling stem, a cylindrical housing, a coaxial cup-shaped casing received in the housing having a centrally apertured bottom wall through which said stem extends, radial pins extending through the housing and into bores in the side of said casing for transmitting thrust between the casing and housing, a spherical bearing having an outer race supported in said casing coaxial therewith and a rotatable inner race tiltable relative to the axis of the outer race, an internally threaded sleeve carried by the inner race of the bearing threadably receiving the traveling stem, a rotatable hollow drive shaft journaled in the housing in coaxial relation with said bearing outer race, said drive shaft having an inside diameter larger than said stem and forming a clearance space for freely accommodating said stem therein during axial traveling movement and tilting movement of the stem relative to the housing, and axially extending interengageable lugs on the opposed ends of said sleeve and drive shaft forming a relatively tiltable rotative driving connection between the drive shaft and sleeve.

8. In a hoist, a non-rotating threaded axially movable traveling stem, an upstanding cylindrical housing, a coaxial cup-shaped casing received in the housing having an open top and a centrally apertured bottom through which said stem extends, radial pins extending through the housing and into bores in the side of said casing for transmitting thrust between the casing and housing, a spherical bearing having an outer race supported in said casing coaxial therewith and an inner race rotatable and tiltable relative to the outer race, a snap ring securing said bearing in said casing in supporting engagement with the bottom thereof, an internally threaded sleeve carried by the inner race of the bearing threadably receiving the traveling stem, a rotatable hollow drive shaft journaled in the housing in coaxial relation with said bearing outer race, said drive shaft having an inside diameter larger than said stem and forming a clearance space for freely accommodating said stem therein during axial traveling movement and tilting movement of the stem relative to the housing, and axially extending interengageable lugs on the opposed ends of said sleeve and drive shaft forming a relatively tiltable rotative driving connection between the drive shaft and sleeve.

9. In a hoist, a non-rotating threaded axially movable traveling stem, an upstanding cylindrical housing, a coaxial cup-shaped casing received in the housing having an open top and a centrally apertured bottom wall through which said stem extends, radial pins extending through the housing and into bores in the side of said casing for transmitting thrust between the casing and housing, a spherical bearing having an outer race supported in said casing coaxial therewith and an inner race rotatable and tiltable relative to the outer race, a snap ring securing said bearing in said casing in supporting engagement with the bottom thereof, an internally threaded sleeve carried by the inner race of the bearing threadably receiving the traveling stem, a lubricant seal in the bottom of said casing having a spherical surface wipingly engaging the lower end of said sleeve, a rotatable hollow drive shaft journaled in the housing in coaxial relation with said bearing outer race, said drive shaft having an inside diameter larger than said stem and forming a clearance space for freely accommodating said stem therein during axial traveling movement and tilting movement of the stem relative to the housing, and axially extending interengageable lugs on the opposed ends of said sleeve and drive shaft forming a relatively tiltable rotative driving connection between the drive shaft and sleeve.

References Cited in the file of this patent

UNITED STATES PATENTS

| | | |
|---|---|---|
| 2,227,111 | Sturm | Dec. 31, 1940 |
| 2,240,977 | Bryant | May 6, 1941 |
| 2,623,403 | Terdina | Dec. 30, 1952 |